Sept. 24, 1957     J. ZAMBROW ET AL     2,807,082
WELDING PROCESS
Filed Aug. 26, 1952
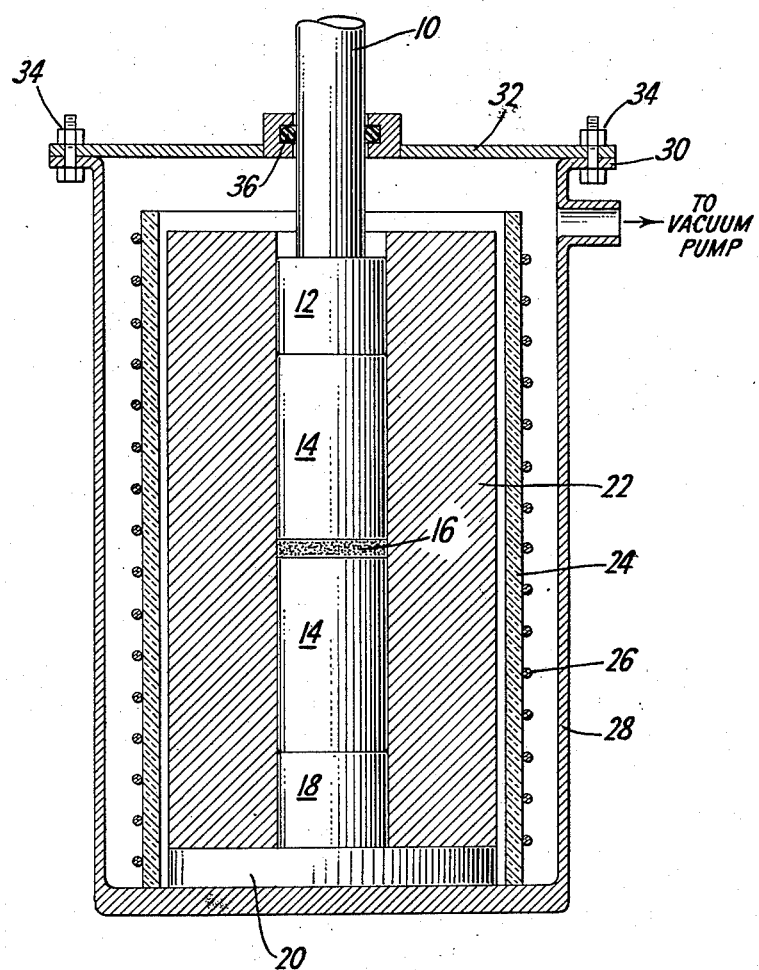
INVENTORS
HENRY HAUSNER
JOHN ZAMBROW
BY
ATTORNEY

United States Patent Office 2,807,082
Patented Sept. 24, 1957

2,807,082

WELDING PROCESS

John Zambrow, Bayside, and Henry H. Hausner, New York, N. Y., assignors, by mesne assignments, to the United States of America as represented by the United States Atomic Energy Commission Application August 26, 1952, Serial No. 306,338

6 Claims. (Cl. 29—488)

This invention relates to a method of joining metal parts, and more particularly to such a method wherein powder metallurgy techniques are used. More specifically, this invention relates to a method of welding by sintering of nascent metal at comparatively low temperatures as compared with fusion type processes. In one aspect, the present process relates to the preparation of relatively long, thin fuel element cores for nuclear reactors.

The present process has as its object broadly to overcome some of the problems that arise in the usual welding procedures. A problem that is frequently encountered is that the surfaces to be joined must be clean since the presence of even a microscopically thin oxide film interferes with bonding. This has previously been accomplished by chemical and mechanical means including filing, the use of pickling baths and of fluxes. In fusion type methods the relatively high temperatures reached enhance the tendency to oxidize. A molten constituent must be present and care must then be taken that the molten pool is free of oxide, dirt, gases and other foreign matter. Freezing of molten metal with slow cooling produces a coarse grain size which gives lower strength and ductility. In pressure welding the members are upset and they must be treated as by rolling or the like to restore the desired shape.

A general object of the invention is to provide a novel and convenient method of welding metal parts. Another object is to avoid melting or upsetting in such an operation. Another object is to prevent coarsening of the grain size in the finished metal parts and thus loss of strength and ductility. Another object is to devise a relatively low temperature welding method which produces a sound bond. Another object is to weld by sintering rather than by fusion. Another object is to provide an effective method of preparing the surfaces prior to joining them. Another object is to provide a welding method readily adaptable to the fabrication of parts by powder metallurgy. Still another object is to provide means for preparing fuel element cores having a large length to diameter ratio, that will withstand the conditions of thermal cycling and intensive radiation existing in a nuclear reactor. A further object is to prepare the surfaces of parts for joining and to join them, all by a unitary means.

The novel process of this invention includes the steps of cleaning the surfaces, that are to be joined, of the metal parts to remove oxides and other undesirable contaminants; placing the surfaces together; providing between and in contact with them a layer of a compound in finely divided form that is decomposable to metal by heat; heating the members at the contact zone and maintaining them under pressure during heating to decompose the compound to metal and sinter the members and reduced metal together thereby producing a weld. Preferably the system is continuously evacuated to remove air and gases of decomposition so as to continually upset the equilibrium and bring the reaction to completion. Apparently, during decomposition of the finely divided compound, the metal particles are in a certain state of instability which results in their increased mobility. The degree of mobility of the metal atoms corresponds to that at far higher temperatures than those at which the decomposition actually takes place. Because of the increased degree of mobility, the metal atoms will be in a state of high reactivity and will sinter and bond more readily than when ordinary metal powder is used between the members. The compound is composed of a metal and a substance that does not react with the members at the welding temperature, preferably a non-oxidizing or reducing gas. Upon decomposition, the gas is evolved and effectively shields the surfaces from oxidation by residual amounts of oxidizing gases in the evacuated system. The preferred class of compounds of this invention is the metal hydrides which release hydrogen. Suitably the hydride is formed of a metal that is strong and ductile so that the weld will have these properties. The finely divided compound is conveniently used in the form of a dry powder but may also be used wet or as a thick paste. Care should then be taken that the materials added are volatile under the conditions used and are not reactive towards the metal present. Liquids such as water, ethyl alcohol and hydrocarbons and binders such as polystyrene resins may be used for this purpose. Examples of useful metal compounds are uranium hydride, zirconium hydride, titanium hydride, thorium hydride, and iron nitride. Many others will suggest themselves to those skilled in the art and their selection will depend on the properties of the metal of the members and the compounds themselves, particularly the relation between the melting point of the metal and the decomposition temperature of the compound. The latter should be lower than the former. The operating temperature will be below the melting point of the members and sufficiently high to cause decomposition and sinter the mass to high density. Frequently this may be less than 50% of the melting point. When uranium is present it is desirable, as explained more fully in application Ser. No. 250,822 of Kingston and Roboff, filed October 11, 1951, to arrange the conditions so that the temperature is within the alpha phase range inasmuch as treatment above the alpha phase increases grain size and decreases the randomness of orientation of the grains, effects which it is desirable to avoid when the products are to be used as fuel element cores for nuclear reactors. When the intermediate layer consists essentially of uranium hydride, a useful hot pressing temperature range is about 450° C. to 660° C.; and for zirconium hydride it is about 600° C. to 750° C. The pressing pressure is not critical and advantageously may be about 10 t. s. i. although pressures as high as 100 t. s. i. may be used if desired.

It has been found particularly desirable to treat the surfaces prior to welding, and suitably after pickling in an acid bath to remove any oxide film present, by forming on them a layer of a compound of the same metal which is decomposable by heat to the metallic state. The other constituent is a substance that does not react with the members at the welding temperature, preferably a non-oxidizing reducing gas. The preferred compound is the hydride of the metal to be joined. To convert the surfaces to the hydride, the parts are maintained in a hydrogen atmosphere at an elevated temperature suitable for forming the particular hydride, for a sufficient period of time to form the layer. During welding, the compound decomposes and releases the gas and provides a very effective shield against air. This method of preparing the surfaces is useful for any metals on which a suitable compound can be formed and especially for metals that are strong getters, for example titanium, zirconium and uranium. One may, for example, hydride the surfaces of the parts and place an additional amount of hydride powder between them and hot press, so that the hydriding apparatus and techniques have double utility. The convenience of combining the two steps is thus evident.

The method will be described in detail in the following examples and with reference to the attached figure which illustrates, in vertical cross section, one mode of arranging the materials in the operation and the equipment used.

Referring to the figure, a cup-shaped container 28, adapted to be evacuated, is provided with a bottom plate 20 and a cover plate 32 adapted to be secured to the container at flanges 30 by means of screws 34. A die 22 is inserted within the container to rest on plate 20 and is surrounded by furnace 24 provided with an induction coil 26. Fitting snugly within the die and mounted on plate 20 are the bottom punch 18, the metal parts 14 to be joined supported thereon and between the parts a layer of powder of the decomposable metal compound 16. The top punch 12 rests on the upper of the members 14 and the pressure ram 10 contacts the top punch and is adapted to be advanced and withdrawn through an opening in the cover plate 32 and in contact with the friction relieving washer 36.

In operation, the materials and equipment may be arranged as shown although other arrangements may be used and other equipment such as a different heating means than that shown. The system is evacuated by means of the vacuum pump (not shown), the die 22 is heated by means of the heating means 26 to the desired temperature and pressure is applied to the members 14 and interposed powder 16 by means of the pressure ram 10.

*Example 1*

Two uranium slugs, each about 2 inches long and about 1½ inches in diameter, were prepared by hot pressing uranium hydride in a die at about 550–600° C. and 11 t. s. i. for about 15 minutes under vacuum. They were machined to 1.4385 inches in diameter. The hardness of the specimens was 28 $R_c$ indicating a grain size of 10–20 microns. The grain size was checked metallographically and found to be in the range of 5–25 microns. The specimens were pickled in 50% $HNO_3$ just prior to their second insertion in the die. About 25 gs. of $UH_3$ was loaded into the die between the two compacts, as shown in the drawing. The assembly was then hot pressed at about 585–630° C. and 11 to 20 t. s. i. for about 15 minutes. The hydrogen released by the decomposition of the hydride was continuously drawn off by a vacuum pump. The welded compact was then machined. Its characteristics were as follows: 4.085 inches in length; 1.429 inches in diameter; density, 18.90 gs./cc. (close to theoretical); hardness, 27–28 $R_c$; grain size, about 20 microns. The compact was visually perfect at the weld. No intermediate layer of $UH_3$ or its decomposition product could be detected. It was subjected to testing by thermal cycling simulating the thermal cycling conditions which exist in a nuclear reactor. At the end of the test, the surface of the sample was extremely smooth and it showed excellent resistance to dimensional change.

*Example 2*

Four uranium slugs, each about 2 inches long and 1½ inches in diameter, were prepared by hot pressing uranium hydride at about 555–585° C. and 11 t. s. i. for 10–15 minutes. The slug ends were pickled in 8 N $HNO_3$ and washed with acetone. The slugs were then maintained in a furnace in which a continuous flow of hydrogen gas was maintained, at about 230° C. for about 20 minutes. At the end of this time the surfaces of the specimens were covered with uranium hydride. The four bars were placed in a die and 75 gs. of uranium hydride was loaded in 25 gram lots between the segments. They were then hot pressed at about 550–585° C. and 11 t. s. i. for 10 minutes under vacuum conditions. A strong weld was thus produced which passed a hammer test.

*Example 3*

Four individual uranium compacts, about 2 inches in length and about 1½ inches in diameter, were prepared by hot pressing uranium hydride in a die heavily coated with Aquadag at temperatures of about 550–600° C. and 11 t. s. i. for 15 minutes under vacuum conditions. The density of the compacts was approximately 18.90 gs./cc. and the $R_c$ hardness about 29. The four segments were pickled in 8 N nitric acid. They were then loaded into a die heavily coated with Aquadag and 75 gs. of uranium hydride in portions of 25 gs. each were placed between the segments. The assembly was hot pressed under substantially the same conditions as the individual compacts and a satisfactorily welded, approximately 8-inch long bar was obtained. The density of this bar was 18.90 gs./cc.

It will be evident that the welding method of this invention is well adapted for use in connection with the preparation of the metal parts themselves by powder metallurgical methods, since the equipment needed is of similar character. However, it can be used when the parts are made by other processes, e. g., casting. The method is particularly valuable for the powder metallurgy production of parts having re-entrant angles, or having a large length to diameter ratio such as relatively long, thin fuel element cores for nuclear reactors. Fuel element cores of this shape have been found desirable but it has been difficult to prepare them by powder metallurgical techniques. The fuel element cores contain or consist of a fissionable material, for example, uranium, plutonium, thorium and protactinium. The uranium may be natural, enriched, or pure U–235. The fissionable material may be in the form of the metal or an alloy with a non-fissionable metal such as zirconium, beryllium, tin, columbium, etc. As an illustration, the alloy may consist of 5% by weight uranium with 92% zirconium as a diluent and 3% tin as a corrosion inhibitor. In welding segments of such cores together, one may use, for example, the hydride of uranium, zirconium or thorium.

Cores made as described above may be jacketed by various methods such as by dipping the core into a low melting point solder whose purpose is to promote good bonding between the core and the jacket, and then sealing in a tightly fitting metal can such as an aluminum can, as described in application Ser. No. 250,822 of W. E. Kingston and S. B. Roboff.

Detailed information concerning the operation of nuclear reactors is given in an application of Fermi and Szilard, Serial Number 568,904, filed December 19, 1944, now Patent No. 2,708,656.

Since many embodiments might be made of the present invention and since many changes might be made in the embodiment described, it is to be understood that the foregoing description is to be interpreted as illustrative only and not in a limiting sense.

We claim:

1. The method of forming relatively long, thin fuel elements for nuclear reactors which comprises the steps of forming a plurality of uranium fuel elements by hot pressing uranium hydride in powder form, placing the elements so produced in alignment with opposite faces adjacent one another, providing between said faces and in contact therewith powdered uranium hydride, heating the assembly to a temperature below the melting point of uranium and applying pressure to the elements during heating to decompose the hydride and sinter the uranium so produced and the elements together.

2. The method of claim 1 wherein the plurality of uranium fuel elements are formed by casting.

3. The method of forming relatively long, thin fuel elements for nuclear reactors which comprises the steps of forming a plurality of uranium containing fuel elements by hot pressing a powder comprising uranium and alloying metals, placing the elements so produced in alignment with opposite faces adjacent one another, providing between said faces and in contact therewith a layer of uranium hydride powder, heating the assembly to a temperature below the melting point of uranium and applying pressure to the elements during heating to decompose the hydride and sinter the uranium so produced and the elements together.

4. The method of claim 3 wherein the plurality of fuel elements are composed of a zirconium-uranium alloy.

5. The method of welding uranium parts which comprises causing the uranium parts to react with hydrogen to produce a relatively thin surface layer of uranium hydride, placing the surfaces to be joined together, placing an additional quantity of uranium hydride powder between the surfaces and in contact therewith, heating the zone of contact to a temperature below the melting point of uranium and applying pressure to the parts during heating to decompose the hydride and sinter the uranium so produced and the parts together.

6. The method of claim 3 wherein the plurality of fuel elements are composed of a zirconium-uranium-tin alloy.

References Cited in the file of this patent

UNITED STATES PATENTS

| | | |
|---|---|---|
| 1,896,853 | Taylor | Feb. 7, 1933 |
| 2,506,327 | Harrington | May 2, 1950 |
| 2,606,132 | Klinker | Aug. 5, 1952 |

FOREIGN PATENTS

| | | |
|---|---|---|
| 503,874 | Great Britain | Apr. 17, 1939 |
| 573,595 | Great Britain | Nov. 28, 1945 |